United States Patent
Zhang et al.

(10) Patent No.: US 12,288,982 B1
(45) Date of Patent: Apr. 29, 2025

(54) DISTRIBUTED OPTIMIZATION CONTROL METHOD FOR AIRCRAFT ENERGY SYSTEM CONSIDERING LOSS

(71) Applicant: Tianjin University, Tianjin (CN)

(72) Inventors: Zhicheng Zhang, Tianjin (CN); Peng Li, Tianjin (CN); Haoyu Wang, Tianjin (CN); Zhiqiang Zuo, Tianjin (CN); Yijing Wang, Tianjin (CN); Yunhao Du, Tianjin (CN); Maoxiang Qiu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/966,162

(22) Filed: Dec. 3, 2024

(30) Foreign Application Priority Data

Dec. 18, 2023 (CN) .......................... 202311743748.6

(51) Int. Cl.
*H02J 1/08* (2006.01)
*B64D 47/00* (2006.01)

(52) U.S. Cl.
CPC ............... *H02J 1/08* (2013.01); *B64D 47/00* (2013.01); *B64D 2221/00* (2013.01); *H02J 2203/20* (2020.01)

(58) Field of Classification Search
CPC ........ H02J 1/08; H02J 2203/20; B64D 47/00; B64D 2221/00
See application file for complete search history.

(56) References Cited

U.S. PATENT DOCUMENTS

| | | | |
|---|---|---|---|
| 2003/0078704 A1* | 4/2003 | Partel | B64D 45/00 701/3 |
| 2013/0190949 A1* | 7/2013 | Constans | B64C 19/00 701/99 |

* cited by examiner

*Primary Examiner* — Charles Cai
(74) *Attorney, Agent, or Firm* — Bayramoglu Law Offices LLC

(57) ABSTRACT

A distributed optimization control method for an aircraft energy system considering loss includes the following steps: S1, based on characteristics of the actual near-space aircraft energy system and the near-space environment, the multi-bus DC microgrid system model is established for the near-space aircraft energy system according to Kirchhoff's law; S2, according to the energy scheduling requirement of the near-space aircraft energy system, the system control target is established; S3, according to the system control target, the optimal scheduling problem of the aircraft energy system considering operating loss is established; and S4, based on projection and penalty, the distributed optimization control algorithm is designed. The distributed optimization control method realizes bus voltage regulation and current distribution. The soft constraint of output current and line current of the DC/DC converter is realized by penalty, and the hard constraint of bus voltage is realized based on the projection operator.

5 Claims, 10 Drawing Sheets

DISTRIBUTED OPTIMIZATION CONTROL METHOD FOR AIRCRAFT ENERGY SYSTEM CONSIDERING LOSS

CROSS REFERENCE TO THE RELATED APPLICATIONS

This application is based upon and claims priority to Chinese Patent Application No. 202311743748.6, filed on Dec. 18, 2023, the entire contents of which are incorporated herein by reference.

TECHNICAL FIELD

The invention relates to the field of optimization control technology of aircraft energy systems, in particular to a distributed optimization control method for an aircraft energy system considering loss.

BACKGROUND

In recent years, with the increasing strategic value of near-space, the research on near-space aircraft has been carried out rapidly. The research shows that the near-space aircraft, as a high-altitude pseudo satellite, can play an important role in various fields, such as communication relay, investigation and monitoring, surveying and mapping, weather forecasting, etc. To give full play to the unique advantages of the near-space aircraft, while maintaining the cruising height of the near-space, the aircraft has the requirement of long endurance. By using sufficient photovoltaic power generation in near space, the problem of fuel cell endurance can be well compensated. With the rapid development of solar photovoltaic technology in recent years, the research and development of long-endurance solar UAVs has attracted the attention of various countries. The energy management system on the near-space aircraft can be abstracted into a direct current (DC) microgrid composed of multiple photovoltaic energy storage nodes. Through high-efficiency, low-loss energy optimization scheduling and distributed cooperative control, the near-space aircraft can ensure long-term continuous flight at high altitudes.

Most of the existing optimal scheduling control technologies for aircraft energy systems are suitable for single-bus DC microgrids. In contrast, the multi-bus DC microgrid model is more suitable for the actual near-space aircraft energy system. In the existing optimal scheduling control technology of the DC microgrid, optimization and control are mostly carried out at different time scales, and there is a time scale contradiction between upper optimization and lower real-time control. Therefore, the lower real-time control often fails to track the optimal working point provided by the upper optimization solution in real-time under the condition of severe load switching. In addition, the proportional coefficient of power allocation in real-time control comes from the upper-level optimization solution process, which cannot be arbitrarily selected. Considering the actual energy scheduling requirements, the power distribution ratio coefficient of the near-space aircraft energy system needs to be proportional to the capacity of the energy storage battery. Therefore, it is necessary to reserve the degree of freedom of the power distribution ratio coefficient that can be freely selected. In summary, a distributed optimization control method for an aircraft energy system considering loss is urgently needed to meet its practical engineering needs.

SUMMARY

The purpose of this invention is to provide a distributed optimization control method for an aircraft energy system considering loss, which realizes bus voltage regulation and current distribution. The soft constraints of output current and line current of the DC/DC converter are realized by penalty, and the hard constraints of bus voltage are realized based on the projection operator.

To achieve the above purpose, the invention provides a distributed optimization control method for an aircraft energy system considering loss, including the following steps:

S1, based on characteristics of an actual near-space aircraft energy system and a near-space environment, establishing a multi-bus DC microgrid system model for the near-space aircraft energy system according to Kirchhoff's law;

S2, according to an energy scheduling requirement of the near-space aircraft energy system, establishing a system control target;

S3, according to the system control target, establishing an optimal scheduling problem of an aircraft energy system considering an operating loss;

S4, based on projection and penalty, designing a distributed optimization control algorithm.

Preferably, the multi-bus DC microgrid system model is established in S1, according to an input voltage and current data and the output voltage and current data of the near-space aircraft energy system, fitting a functional relationship between a loss power of a DC/DC converter and the output current of the near-space aircraft energy system, as shown in the following:

$$I - I_D = G_e V$$

$$I_L = W_e M_e V$$

where V is a bus voltage, I is an output current of a DC/DC converter, $I_D$ is a load current, $I_L$ is a line current, $G_e$ is a node conductance matrix, $M_e$ is a correlation matrix corresponding to an electrical network, elements of $M_e$ are −1, 0, 1, $W_e$ is a diagonal coefficient matrix, and a diagonal element of $W_e$ is an electrical transmission line conductance at a corresponding position of the correlation matrix.

Preferably, a loss power of the DC/DC converter has a quadratic function relationship with the output current of the near-space aircraft energy system.

Preferably, in S2, the system control target is established as follows:

$$\begin{cases} \lim_{t \to \infty} \dfrac{I_i(t)}{m_i} = \lim_{t \to \infty} \dfrac{I_j(t)}{m_j}, & \text{if } i, j = 1, 2, \ldots, N \\ \lim_{t \to \infty} V_i(t) = V_i^{ref}, & \text{if } i = 1, 2, \ldots, N \end{cases}$$

where $V_i(t)$ is a bus voltage at time t, $I_i(t)$ is the output current of the DC/DC converter at time t, and $V_i^{ref}$ is a reference value of a bus voltage of an optical storage node i of the near-space aircraft energy system; $m_i$ is a proportional coefficient of a current distribution;

the near-space aircraft energy system satisfies the following electrical inequality constraints:

$$\begin{cases} \underline{V} \le V \le \overline{V} \\ \underline{I} \le I \le \overline{I} \\ I_L \le \overline{I_L} \end{cases}$$

where $\underline{V}$, $\overline{V}$ are an upper limit and a lower limit of the bus voltage, $\underline{I}$, $\overline{I}$ are an upper limit and a lower limit of the output current of the DC/DC converter, $I_L$ is the line current, $\overline{I_L}$ is an upper limit of the line current;

a total loss of the DC/DC converter of an entire aircraft energy system $P_{Loss}{}^C$ is in a form of the following:

$$P_{Loss}{}^C = \Sigma_{i=1}{}^N P_{Loss(i)}{}^C = \Sigma_{i=1}{}^N (a_i I_i{}^2 + b_i |I_i| + c_i) = (1_N{}^T A 1_N + b^T 1_N + 1_N{}^T c)$$

where $a_i$ is a secondary loss coefficient of the DC/DC converter in the optical storage node i, $b_i$ is a primary loss coefficient of the DC/DC converter in the optical storage node i, $c_i$ is a loss constant term of the DC/DC converter in the optical storage node i; $1_N = [1, 1, \ldots, 1]^T$ is a unit column vector composed of N elements, and $A = \text{diag}([a_1, a_2, \ldots, a_N])$, $b = [b_1, b_2, \ldots, b_N]^T$, $c = [c_1, c_2, \ldots, c_N]^T$ are loss coefficients of the DC/DC converter;

a total line loss of the entire aircraft energy system $P_{Loss}{}^L$ is as follows:

$$P_{Loss}^L = \sum_{i=1}^N P_{Loss}^L(i) = \sum_{i=1}^N \left(\frac{1}{2} \cdot \sum_{j \in N^i} g_{ij}(V_i - V_j)^2\right) = V^T G_e V$$

an operating loss of the entire near-space aircraft energy system is as follows:

$$P_{Loss} = P_{Loss}{}^C + P_{Loss}{}^L$$

Preferably, in S3, the optimal scheduling problem of aircraft energy system considering operating loss is established as follows:

$$P_1 : \min C(V, I, I_D) = w_1 \cdot P_{Loss} + w_2 \cdot \frac{1}{2}(\mu_1 \Delta_I + \mu_2 \Delta_V)$$

s.t.

$$I_D = I - G_e V$$

$$I_L = W_e M_e V$$

$$\underline{V} \leq V \leq \overline{V}$$

$$\underline{I} \leq I \leq \overline{I}$$

$$I_L \leq \overline{I_L}$$

where $w_1$, $w_2$, $\mu_1$, $\mu_2 > 0$ are weight coefficients of the control target, and $\mu_1 + \mu_2 = 1$; a current distribution error is $\Delta_I = (MGV + QI_D)^T(MGV + QI_D)$, where $$Q = -\frac{11^T}{1^T M^{-1} 1}, \quad M = \text{diag}\left(\left[\frac{1}{m_1}, \frac{1}{m_2}, \ldots, \frac{1}{m_N}\right]\right)$$

and $(\bullet)^T$ are transposed operations; a voltage regulation error $\Delta_V$ meets $\Delta_V = (V - V^{ref})^T(V - V^{ref})$, $V^{ref} = [V_1^{ref}, V_2^{ref}, V_N^{ref}]^T$.

Preferably, in S4, a distributed optimization control algorithm is designed as follows:

$$\dot{V}_i = -k \cdot V_i + k \cdot P_{\Omega_{V_i}}\left(V_i - \gamma_i - \sum_{j \in N^i} g_{ij}(\theta_{ij} - \theta_{ji})\right)$$

$$\theta_{ij} = w_1 \cdot (2 a_i I_i + b_i \text{sign}(I_i) + 2 V_i) + \rho_I(\nabla \psi(I_i - \overline{I_i}) - \nabla \psi(\underline{I_i} - I_i)) +$$

$$\rho_L \cdot \nabla \psi(I_{Lij} - \overline{I_{Luj}}) + w_2 \cdot \mu_1 \frac{1}{m_i}\left(\frac{I_i - \alpha_i}{m_i}\right)$$

-continued $$\gamma_i = w_2 \cdot \mu_2(V_i - V_i^{ref})$$

$$\dot{\alpha}_i = -k_1 \sum_{j \in N^i} g_{ij}\left(\frac{\alpha_i}{m_i} - \frac{\alpha_j}{m_j}\right) - k_2(\alpha_i - I_D^i) + k_2 \beta_i$$

$$\dot{\beta}_i = -k_1 \sum_{j \in N^i} g_{ij}\left(\frac{\alpha_i}{m_i} - \frac{\alpha_j}{m_j}\right)$$

where $P_{\Omega_{V_i}}(\bullet)$ is a projection on a convex set $\Omega_{V_i} = \{V_i | \underline{V_i} \leq V_i \leq \overline{V_i}\}$, $\nabla(\bullet)$ is a first derivative of a decision variable, $\text{sign}(\bullet)$ is a sign function, $N^i$ is a set of neighbor nodes that communicate directly with a local controller of the optical storage node i of the near-space aircraft energy system, $I_D^i$ is a local load current of the optical storage node i of the near-space aircraft energy system, $k_1$, $k_2$, $k > 0$ are controller gains, $\alpha_i$, $\beta_i$, $\gamma_i$, $\theta_{ij}$ are the controller auxiliary variables;

a penalty function $\psi(x)$ is in a form of the following:

$$\psi(x) = \begin{cases} x & \text{if } x \geq \delta \\ -\frac{x^4}{16\delta^3} + \frac{3x^2}{8\delta} + \frac{x}{2} + \frac{3\delta}{16} & \text{if } |x| < \delta \\ 0 & \text{if } x \leq -\delta \end{cases}$$

where $\delta \geq 0$ needs to be adjusted according to an actual operation.

Preferably, in S1, the characteristics of the near-space environment include altitude, atmospheric pressure, ambient temperature, relative humidity, and light intensity.

Preferably, in S2, the energy scheduling requirements of the near-space aircraft energy system include an output voltage regulation of the near-space aircraft energy system, an output current regulation of the DC/DC converter, an output voltage and current limit control of the aircraft energy system, and a maximum line current limit that ensures the safety of the line.

Preferably, in S4, the distributed optimization control algorithm based on projection and penalty, an input is a data sampling of the input voltage and current and output voltage and current of the near-space aircraft energy system, and an output is the output voltage of the near-space aircraft energy system.

Therefore, the invention adopts the above distributed optimization control method for the aircraft energy system considering loss to realize bus voltage regulation and current distribution, the soft constraint of output current and the line current of the DC/DC converter is realized by penalty, and the hard constraint of bus voltage is realized based on projection operator.

The following is a further detailed description of the technical scheme of the invention through drawings and an embodiment.

BRIEF DESCRIPTION OF THE DRAWINGS

FIG. 7A is a bus voltage $V_i$ curve under the distributed algorithm proposed by the invention; FIG. 7B is a bus voltage $V_i$ curve under the traditional distributed optimization algorithm;

FIG. 8A is an output current curve of the DC/DC converter under the distributed algorithm proposed by the invention; FIG. 8B is an output current curve of the DC/DC converter under the traditional distributed optimization algorithm;

FIG. 9A is the line current curve under the distributed algorithm proposed by the invention; FIG. 9B is the line current curve under the traditional distributed optimization algorithm;

DETAILED DESCRIPTION OF THE EMBODIMENTS

The following is a further explanation of the technical scheme of the invention through drawings and an embodiment.

Embodiment

Figure 1:
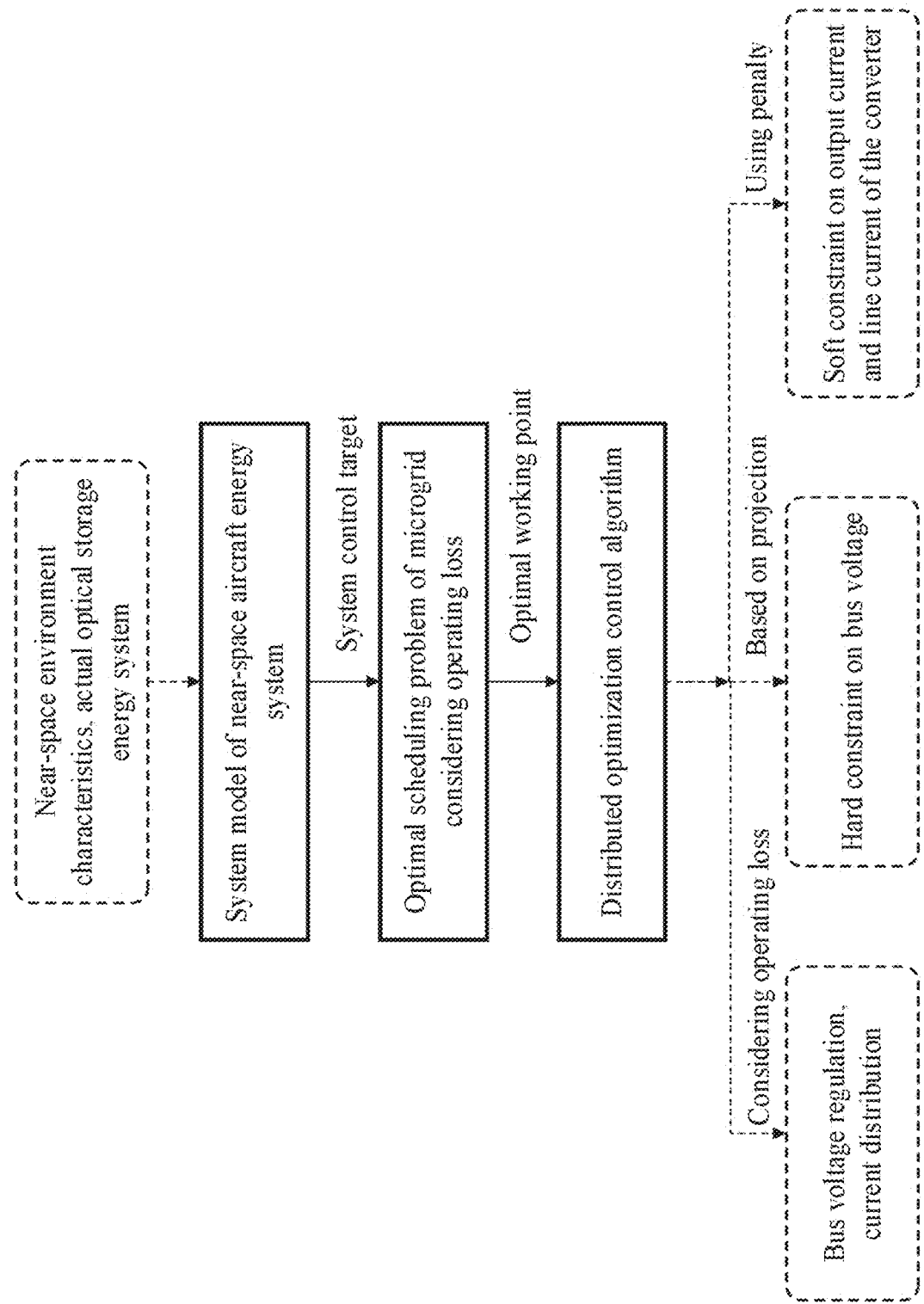
FIG. 1 is a flow chart of the distributed optimization control method for the aircraft energy system considering loss.
Figure 2:
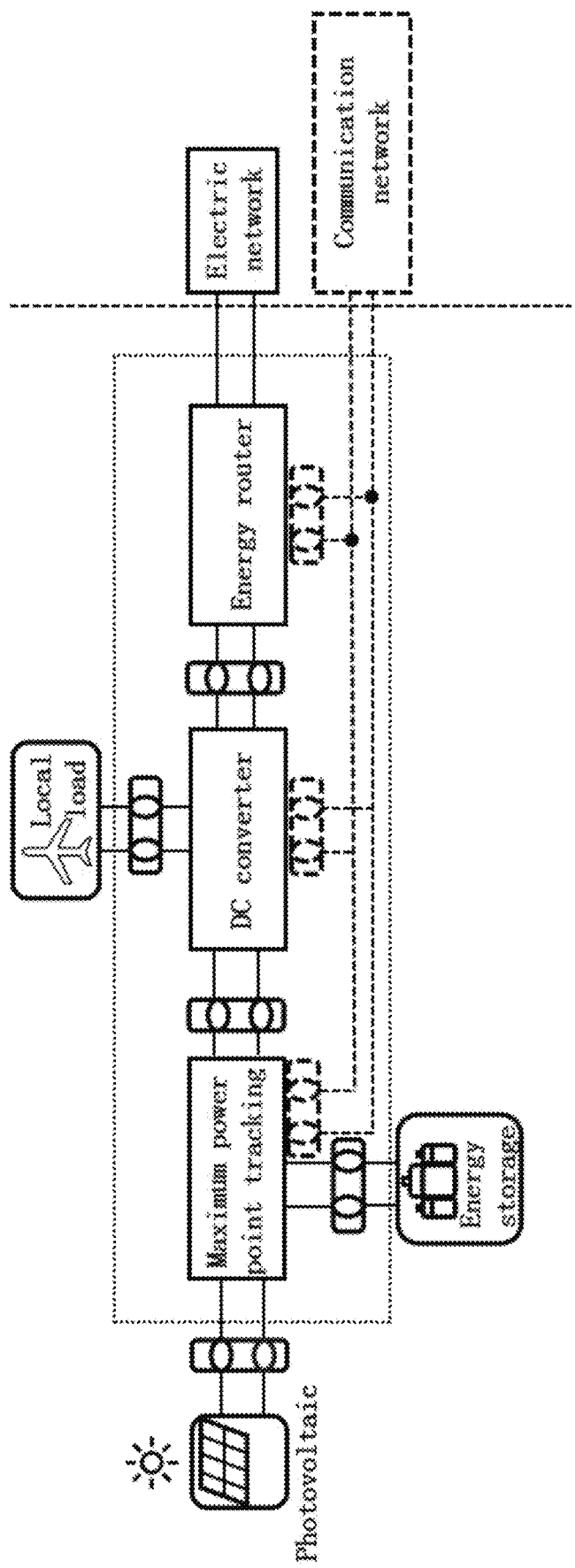
FIG. 2 is a schematic diagram of the optical storage node of the actual near-space aircraft energy system in the embodiment of the invention.

As shown in FIG. 1, the invention provides a distributed optimization control method for the aircraft energy system considering loss, the specific steps of the embodiment are as follows:

S1, based on characteristics of the actual near-space aircraft energy system and the near-space environment, the multi-bus DC microgrid system model for the near-space aircraft energy system is established;

Firstly, the single optical storage node in the actual near-space aircraft energy system is shown in FIG. 2, considering that the voltage fluctuation of the photovoltaic power generation in the front stage of the near-space aircraft energy system is slow on the time scale, at the same time, the end of the photovoltaic power generation is connected to the energy storage unit, which can effectively suppress the voltage fluctuation. Therefore, the photovoltaic power generation of the front stage of the near-space aircraft energy system can be regarded as a DC source with controllable output voltage. Therefore, the near-space aircraft energy system can be simplified into a multi-bus DC microgrid. The transmission line impedance of the DC microgrid is mainly resistive. According to the singular perturbation theory, based on the quasi-stationary line, the inductance of the power line is ignored. The characteristics of the near-space environment include altitude, atmospheric pressure, ambient temperature, relative humidity, and light intensity.

Figure 3:
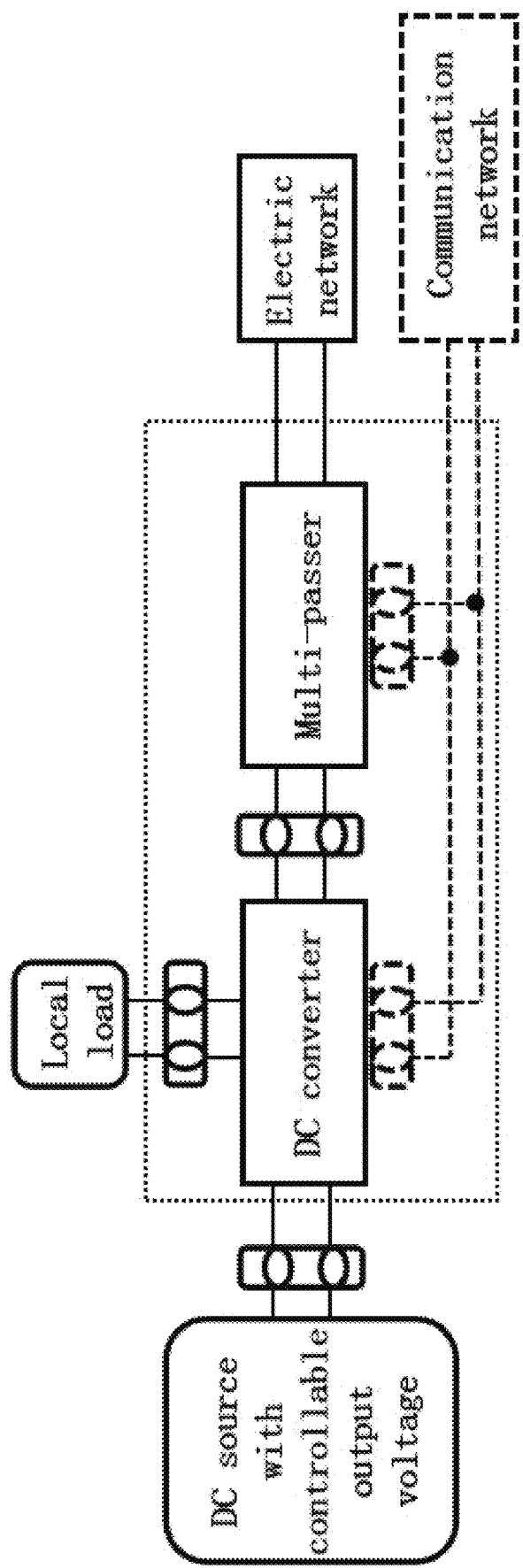
FIG. 3 is a simplified schematic diagram of the optical storage node of the near-space aircraft energy system in the embodiment of the invention.
Figure 4:
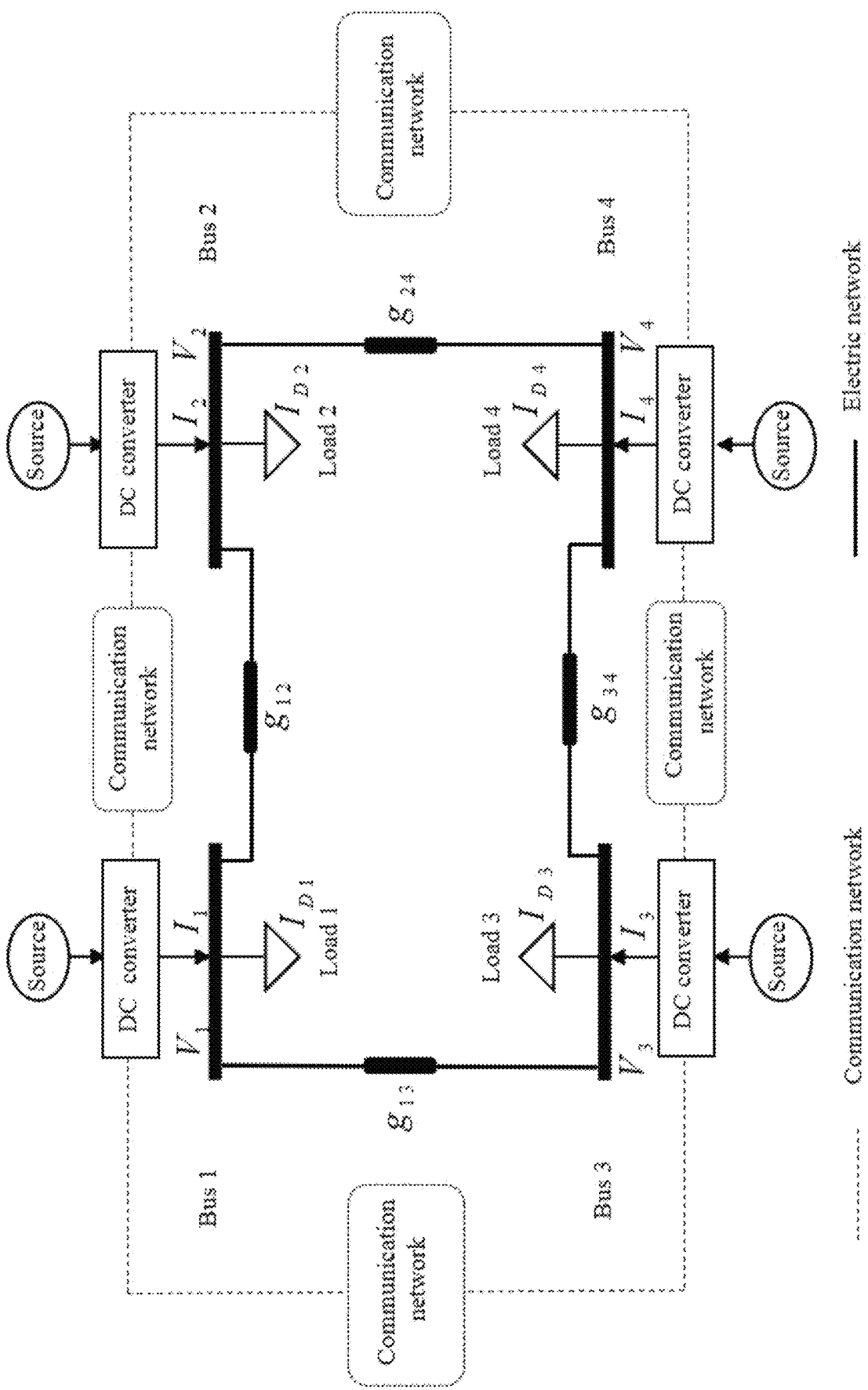
FIG. 4 is an example of a multi-bus DC microgrid of the near-space aircraft energy system in the embodiment of the invention.

Therefore, a simplified optical storage node model of the near-space aircraft energy system can be established, as shown in FIG. 3. Based on the simplified optical storage node model of the near-space aircraft energy system, a multi-bus DC microgrid model of the near-space aircraft energy system composed of four optical storage nodes of the near-space aircraft energy system can be established, as shown in FIG. 4.

Secondly, the near-space aircraft energy system is interconnected by N optical storage nodes of the near-space aircraft energy system through an electrical network formed by 2M power lines, an optical storage node of the near-space aircraft energy system consists of a photovoltaic, a DC/DC converter and local load. Among them, the working mode of the local load is constant current load, constant voltage load, constant resistance load, constant power load, or the parallel combination of the above loads. The output voltage of the optical storage node of each near-space aircraft energy system is controlled by a local distributed controller, the distributed controller exchanges the output voltage and output current data of the near-space aircraft energy system with its neighbors through the communication network, and adjusts the output voltage of the optical storage node of the near-space aircraft energy system with a distributed control algorithm. According to Kirchhoff's law, a compact electrical model of the near-space aircraft energy system can be established.

For the multi-bus DC microgrid of the general near-space aircraft energy system, the following electrical model can be established:

$$I - I_D = G_e V$$

$$I_L = W_e M_e V$$

where V is the bus voltage, I is the output current of the DC/DC converter, $I_D$ is the load current, and $I_L$ is the line current. $G_e$ is the node conductance matrix, and its element is $$G_e(i,j) = \begin{cases} -g_{ij} & \text{if } i \neq j \\ \sum_{k=1, k \neq i}^{N} g_{ik} & \text{if } i = j \end{cases}, g_{ij}$$

indicates the line conductance between bus i and bus j, and N is the number of optical storage nodes of the near-space aircraft energy system. $M_e$ is the correlation matrix corresponding to the electrical network, and its element is −1, 0, 1. $W_e$ is a diagonal coefficient matrix, and its diagonal elements are the electrical transmission line conductance at the corresponding position of the correlation matrix.

Finally, according to the input voltage and current data and the output voltage and current data of the near-space aircraft energy system, the function relationship between the loss power of the DC/DC converter in the DC/DC converter and the output current of the near-space aircraft energy system is fitted.

S2, Based on the multi-bus DC microgrid model of the near-space aircraft energy system, the control target of the near-space aircraft energy system is established according to the actual demand of the energy scheduling of the near-space aircraft energy system.

The energy scheduling requirements of the near-space aircraft energy system include the output voltage regulation of the near-space aircraft energy system, the output current regulation of the DC/DC converter proportional to the energy storage capacity, the limit control of the output voltage and current of the aircraft energy system, and the maximum line current limit that ensures the safety of the line. While realizing the energy scheduling of the near-space aircraft energy system, it is necessary to fully consider the actual requirements of the near-space aircraft for high efficiency and low loss. Therefore, it is necessary to focus on the operating loss of the entire near-space aircraft energy system. Based on this, the control target of the near-space aircraft energy system can be established as follows:

$$\begin{cases} \lim_{t \to \infty} \frac{I_i(t)}{m_i} = \lim_{t \to \infty} \frac{I_j(t)}{m_j}, & \text{if } i, j = 1, 2, \ldots, N \\ \lim_{t \to \infty} V_i(t) = V_i^{ref}, & \text{if } i = 1, 2, \ldots, N \end{cases}$$

where $V_i(t)$ is a bus voltage at time t, $I_i(t)$ is the output current of the DC/DC converter at time t, and $V_i^{ref}$ is a reference value of a bus voltage of an optical storage node i of the near-space aircraft energy system.

Voltage regulation and current distribution are two traditional energy scheduling objectives in the DC microgrid of the near-space aircraft energy system. Through voltage regulation, the bus voltage of the optical storage node of each near-space aircraft energy system is equal to the bus voltage reference value. By realizing current distribution and voltage regulation, the power exchange between the optical storage nodes of the near-space aircraft energy system can be realized.

While achieving the above power exchange control objectives, it is also necessary to consider the operating loss of the near-space aircraft energy system. While ensuring the current distribution and voltage regulation performance, the operating loss of the aircraft energy system should be minimized. While achieving the above control objectives, it is necessary to ensure that the near-space aircraft energy system meets the following electrical inequality constraints:

$$\begin{cases} \underline{V} \le V \le \overline{V} \\ \underline{I} \le I \le \overline{I} \\ I_L \le \overline{I_L} \end{cases}$$

where $\underline{V}, \overline{V}$ are the upper limit and the lower limit of the bus voltage, $\underline{I}, \overline{I}$ are the upper limit and the lower limit of the output current of the DC/DC converter, $I_L$ is the line current, $\overline{I_L}$ is the upper limit of the line current.

For the actual near-space aircraft energy system, the bus voltage will directly affect the working state of the load. For some loads, such as storage units and precision sensors mounted on near-space aircrafts, more stringent voltage range restrictions are required. The circuit may be burned out due to the high driving voltage, thus affecting its normal operation.

In addition, frequent and severe voltage fluctuations may shorten the life of electronic components. Moreover, it is also necessary to consider the constraints on the output current of the DC/DC converter. The output current of the DC/DC converter is too high or too low, which will affect the health of the battery energy storage. At the same time, it is necessary to ensure the safety of the line by limiting the line current.

Therefore, given the high requirements of the near-space aircraft energy system for energy utilization, it is necessary to ensure that the operating loss of the near-space aircraft energy system should be taken into account while achieving the above goals.

The total loss of the DC/DC converter of an entire aircraft energy system $P_{Loss}^C$ is in a form of the following:

$$P_{Loss}^C = \Sigma_{i=1}^N P_{Loss(i)}^C = \Sigma_{i=1}^N (a_i I_i^2 + b_i |I_i| + c_i) = (1_N^T A 1_N + b^T 1_N + 1_N^T c)$$

where $a_i$ is a secondary loss coefficient of the DC/DC converter in the optical storage node i, $b_i$ is a primary loss coefficient of the DC/DC converter in the optical storage node i, $c_i$ is a loss constant term of the DC/DC converter in the optical storage node i; $1_N = [1, 1, \ldots, 1]^T$ is a unit column vector composed of N elements, and $A = \text{diag}([a_1, a_2, \ldots, a_N])$, $b = [b_1, b_2, \ldots, b_N]^T$, $c = [c_1, c_2, \ldots, c_N]^T$ are loss coefficient matrices composed of the loss coefficients of the DC/DC converter.

The total line loss of the entire aircraft energy system $P_{Loss}^L$ is as follows:

$$P_{Loss}^L = \sum_{i=1}^N P_{Loss(i)}^L = \sum_{i=1}^N \left( \frac{1}{2} \cdot \sum_{j \in N^i} g_{ij}(V_i - V_j)^2 \right) = V^T G_e V$$

$P_{Loss}$ represents the operating loss of the aircraft energy system. According to the loss characteristics of the DC/DC converter, the operating loss is established as follows:

$$P_{Loss} = P_{Loss}^C + P_{Loss}^L$$

where $P_{Loss}^C$ and $P_{Loss}^L$ respectively represent the sum of DC/DC converter loss and line loss of the aircraft energy system.

S3, according to the system control target, the optimal scheduling problem of the aircraft energy system with multiple constraints considering operating loss is established. Based on the KKT condition and projection operation, the optimal solution of the optimization problem is obtained, and the optimal working point of the system under the current working condition is obtained.

S31, for the system control target proposed in S2, under the premise of ensuring that the near-space aircraft energy system meets the electrical inequality constraints, the current distribution and voltage regulation should be realized, and the operating loss of the aircraft energy system should be minimized. Therefore, it is necessary to establish the following multi-constrained aircraft energy system scheduling problem considering operating loss:

$$P_1 : \min C(V, I, I_D) = w_1 \cdot P_{Loss} + w_2 \cdot \frac{1}{2}(\mu_1 \Delta_I + \mu_2 \Delta_V)$$

$$I_D = I - G_e V$$
$$I_L = W_e M_e V$$
$$\text{s.t. } \underline{V} \le V \le \overline{V}$$
$$\underline{I} \le I \le \overline{I}$$
$$I_L \le \overline{I_L}$$

where $w_1, w_2, \mu_1, \mu_2 > 0$ are weight coefficients of the control target, and $\mu_1 + \mu_2 = 1$; the current distribution error is $\Delta_I = (MGV + QI_D)^T(MGV + QI_D)$, where $$Q = -\frac{11^T}{1^T M^{-1} 1}, M = \text{diag}\left(\left[\frac{1}{m_1}, \frac{1}{m_2}, \ldots, \frac{1}{m_N}\right]\right)$$

and $(\cdot)^T$ are transposed operations; the voltage regulation error $\Delta_V$ meets $\Delta_V = (V - V^{ref})^T(V - V^{ref})$, $V^{ref} = [V_1^{ref}, V_2^{ref}, \ldots, V_N^{ref}]^T$.

In order to solve the multiple inequality constraints in the optimization problem $P_1$, starting from the actual requirements of the electrical inequality constraints of the near-space aircraft energy system, the penalty term is introduced into the optimization cost function to realize the constraints of the output current and line current of the DC/DC converter. For the constraint of bus voltage, it will be guaranteed by projection operation when the optimal solution of the optimization problem is solved subsequently. The penalty term is designed based on the following penalty function:

$$\psi(x) = \begin{cases} x & \text{if } x \geq \delta \\ -\dfrac{x^4}{16\delta^3} + \dfrac{3x^2}{8\delta} + \dfrac{x}{2} + \dfrac{3\delta}{16} & \text{if } |x| < \delta \\ 0 & \text{if } x \leq -\delta \end{cases}$$

where $\delta \geq 0$ needs to be adjusted according to the actual operation.

By introducing the inequality constraints for the output current and line current of the DC/DC converter into the penalty term, the equality constraints of the electrical network in the multi-bus DC microgrid model of the near-space aircraft energy system are substituted into the optimization problem $P_1$, the optimization problem $P_2$ with only one decision variable V can be obtained as follows:

$$P_2: \min F(V) = C(V, G_e + I_D, W_e M_e V) + \psi(G_e V + I_D, W_e M_e V]$$
$$V \in \Omega_V = \{V | \underline{V} \leq V \leq \overline{V}\}$$

Based on the KKT condition and projection operation, the optimal conditions for solving the optimization problem $P_2$ are as follows:

$$V^* = P_{\Omega_V}(V^* - \nabla F(V^*)).$$

where $\nabla(\cdot)$ is the first derivative of the decision variable V, and $P_{\Omega_V}(\cdot)$ is the projection on the convex set $\Omega_V$.

S4, based on projection and penalty, a distributed optimization control algorithm is designed.

The input of the distributed optimization control algorithm based on projection and penalty is the data sampling of the input voltage, current, and output voltage and current of the near-space aircraft energy system, and the output is the output voltage of the near-space aircraft energy system. The designed control algorithm adopts distributed design and distributed implementation to ensure the stability of execution in the near space.

Figure 5:
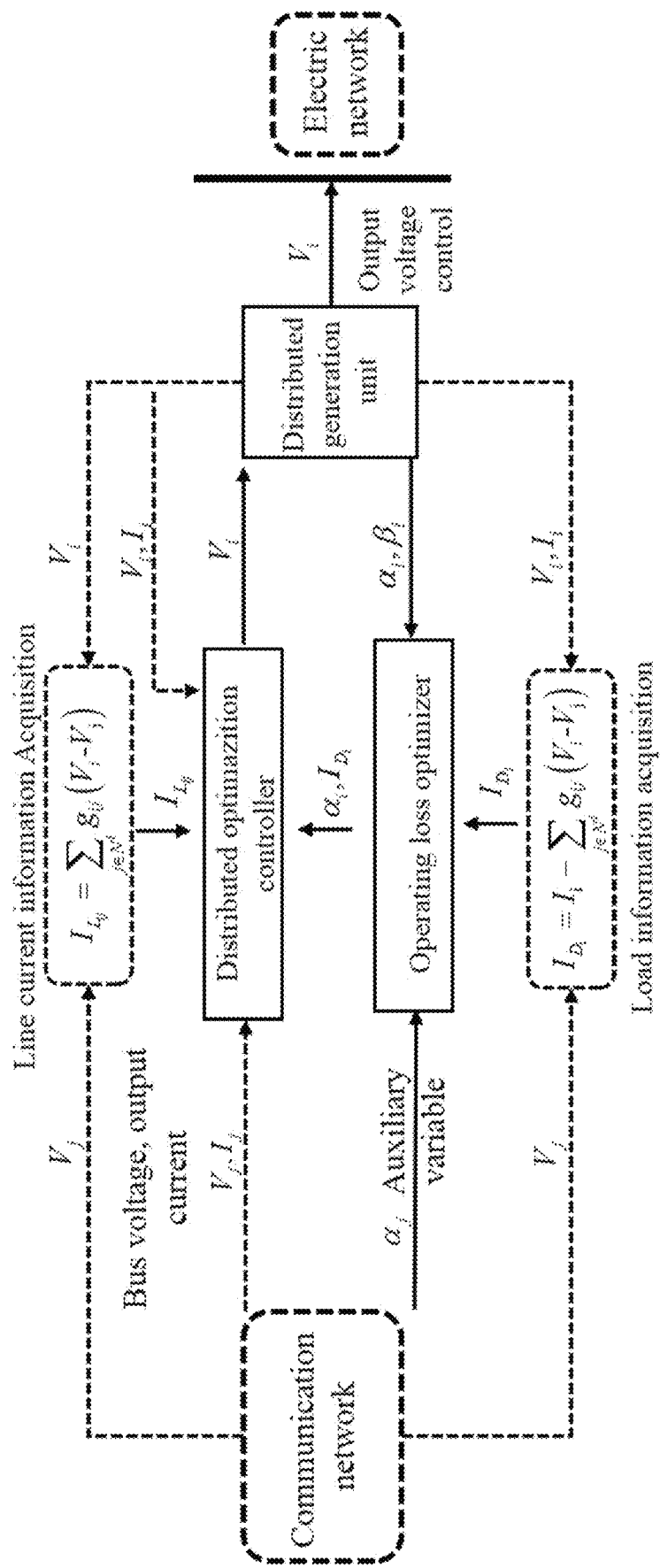
FIG. 5 is a control algorithm block diagram of the distributed optimization control method considering the operating loss of the near-space aircraft energy system.

According to the optimal conditions of the optimization problem $P_2$ in S3, based on the multi-agent PI consensus algorithm, the following distributed optimization control algorithm can be designed:

$$\dot{V}_i = -k \cdot V_i + k \cdot P_{\Omega_{V_i}}\left(V_i - \gamma_i = \sum_{j \in N^i} g_{ij}(\theta_{ij} - \theta_{ji})\right)$$

$$\theta_{ij} = w_1 \cdot (2a_i I_i + b_i \text{sign}(I_i) + 2V_i) +$$
$$\rho_I\left(\nabla \psi(I_i - \overline{I_i}) - \nabla \psi(\underline{I_i} - I_i) + \rho_L \cdot \nabla \psi(I_{Lij} - \overline{I_{Lu,j}}) + w_2 \cdot \mu_1 \frac{1}{m_i}\left(\frac{I_i - \alpha_i}{m_i}\right)\right)$$

$$\gamma_i = w_2 \cdot \mu_2(V_i - V_i^{ref})$$

$$\dot{\alpha}_i = -k_1 \sum_{j \in N^i} g_{ij}\left(\frac{\alpha_i}{m_i} - \frac{\alpha_j}{m_j}\right) - k_2(\alpha_i - I_D^i) + k_2 \beta_i$$

$$\dot{\beta}_i = -k_1 \sum_{j \in N^i} g_{ij}\left(\frac{\alpha_i}{m_i} - \frac{\alpha_j}{m_j}\right)$$

where $P_{\Omega_{V_i}}(\cdot)$ is the projection on the convex set $\Omega_{V_i} = \{V_i | \underline{V_i} \leq V_i \leq \overline{V_i}\}$, and $\text{sign}(\cdot)$ is the sign function. $N^i$ is the set of neighbor nodes that communicate directly with the local controller of the optical storage node i of the near-space aircraft energy system, $I_D^i$ is the local load current of the optical storage node i of the near-space aircraft energy system, $k_1, k_2, k > 0$ are controller gains, $\alpha_i, \beta_i, \gamma_i, \theta_{ij}$ are the controller auxiliary variables;

In the above control algorithm, as shown in FIG. 5, the control target is achieved by adjusting the bus voltage of the optical storage node i of the near-space aircraft energy system. Since the update of the bus voltage i of the optical storage node of the near-space aircraft energy system only depends on the electrical information of the optical storage node $V_i$ and the neighbor nodes directly communicating with its local controller. Therefore, this control method is distributed.

In addition, the designed distributed control algorithm can be implemented only by obtaining the bus voltage information of itself and its neighbor nodes directly communicating with its local controller when the local load information can be detected. When the load information is difficult to obtain in the actual situation, the distributed control algorithm can also be implemented by using the line current or the output current information of the DC/DC converter. At this time, the distributed control algorithm proposed by the invention is robust to load changes.

In this embodiment, the electrical parameters of the multi-bus DC microgrid model of the near-space aircraft energy system and the control parameters of the proposed control algorithm are shown in FIG. 4, as shown in Table 1.

TABLE 1

Nominal values of electrical parameters and control parameters of near-space aircraft energy system

| Sign | Description | Value (p.u.) |
| --- | --- | --- |
| $V_i^{ref}$ | Bus voltage reference value | 1 |
| $\overline{I_{Lij}}$ | Upper limit of the line current | 1 |
| $\underline{I_i}, \overline{I_i}$ | Upper and lower limits of the output current of the DC/DC converter | 0, 1 |
| $\underline{V_i}, \overline{V_i}$ | Upper and lower limits of bus voltage | 0.95, 1.05 |
| $a_1, a_3$ | Secondary loss coefficient of the DC/DC converter | $5.175 \times 10^{-2}$ |
| $a_2, a_4$ |  | $2.675 \times 10^{-2}$ |
| $b_1, b_3$ | Primary loss coefficient of the DC/DC converter | $5.841 \times 10^{-4}$ |
| $b_2, b_4$ |  |  |
| $c_1, c_3$ | Loss constant term of the DC/DC converter | $7.560 \times 10^{-3}$ |
| $c_2, c_4$ |  |  |
| $g_{12}, g_{13}$ | Line coloring conductance | 32, 32, 16, 16 |
| $g_{24}, g_{34}$ |  |  |
| $k, k_1, k_2$ | Optimal control gain | 3, 10, 20 |
| $w_1, w_2, \mu_1, \mu_2$ | Control target weight | 1, 10, 0.85, 0.15 |
| $\rho_I, \rho_L$ | Penalty weight | $1 \times 10^4$ |
| $\delta$ | Penalty function parameter | $2.5 \times 10^{-4}$ |
| $m_1, m_2,$ | Current distribution ratio | 1, 1, 0.5, 0.5 |
| $m_3, m_4$ |  |  |

Figure 6:
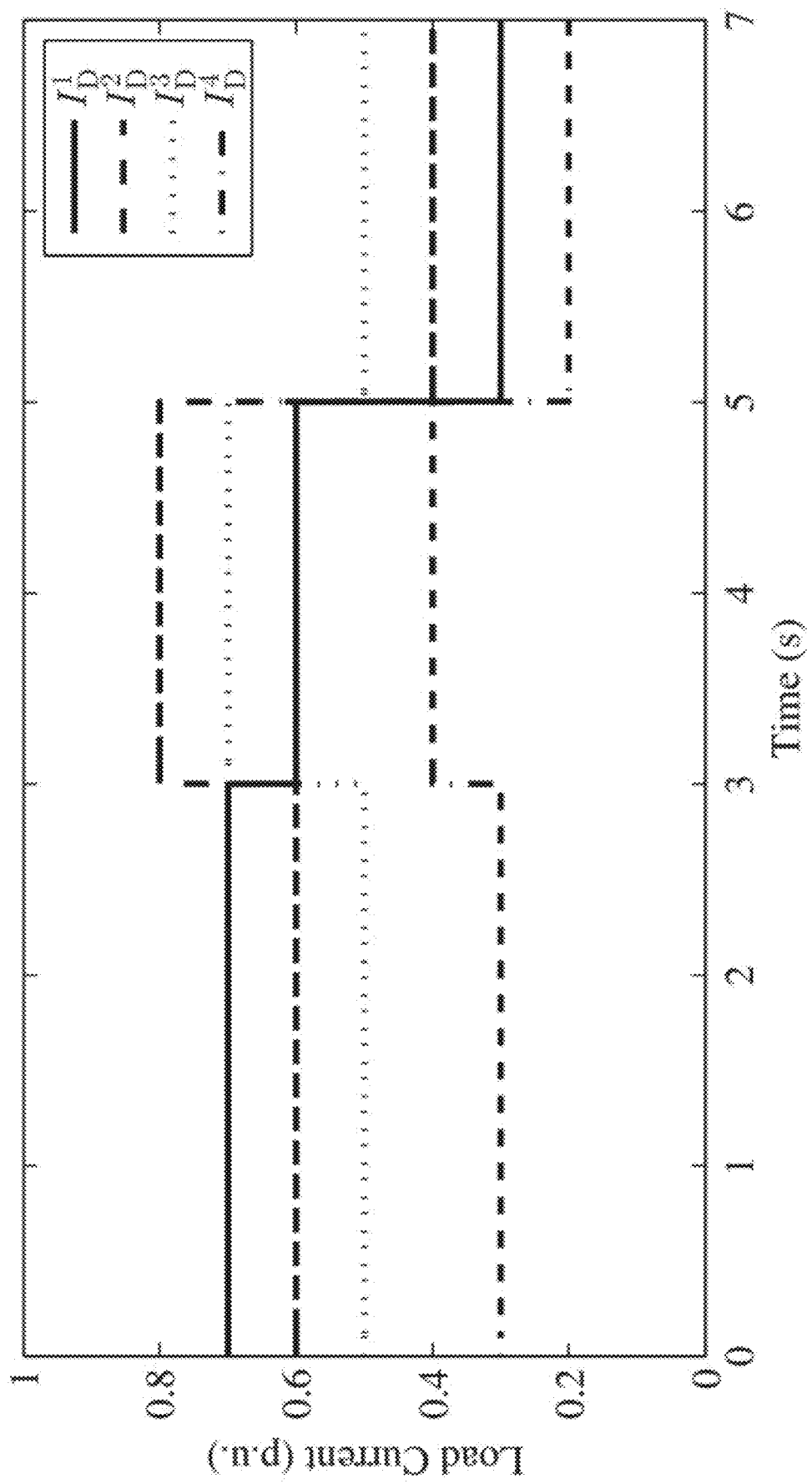
FIG. 6 is a load current $I_D{}^i$ curve in the embodiment of the invention.

In order to reflect the superiority of the proposed control algorithm, the distributed algorithm proposed in the invention is compared with the traditional distributed optimization algorithm, and the load conditions are designed, as shown in FIG. 6.

Figure 7A:
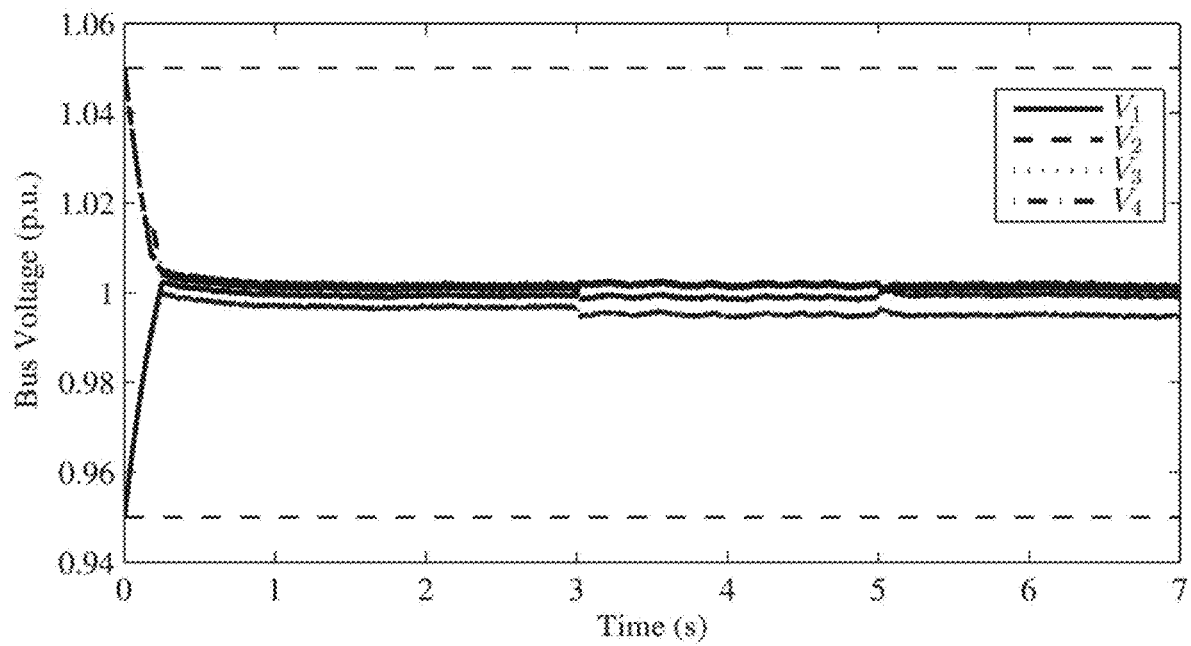
FIGS. 7A-7B are bus voltage $V_i$ curves in the embodiment of the invention; where
Figure 7B:
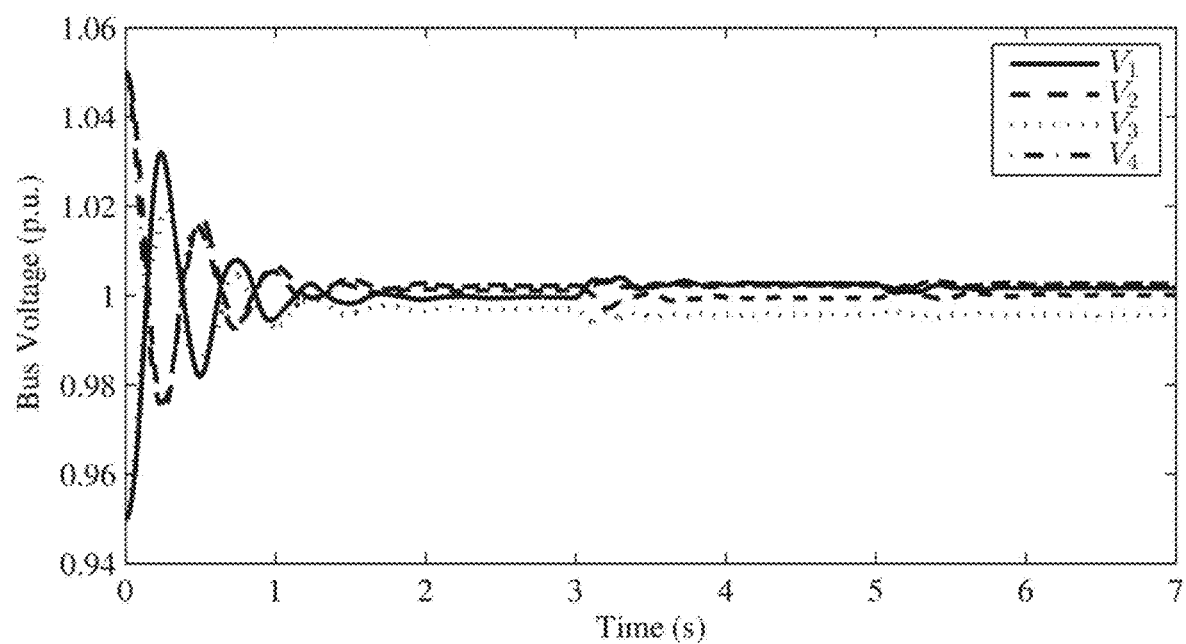

In FIGS. 7A-7B, the bus voltage $V_i$ curves under the distributed algorithm and the traditional distributed optimization algorithm are given respectively, it can be seen that both control algorithms can keep the bus voltage near the reference value. Compared with the traditional distributed optimization algorithm, the distributed algorithm proposed by the invention is faster when it converges to the range of 0.95-1.05 p.u., and the dynamic performance of voltage regulation is better.

Figure 8A:
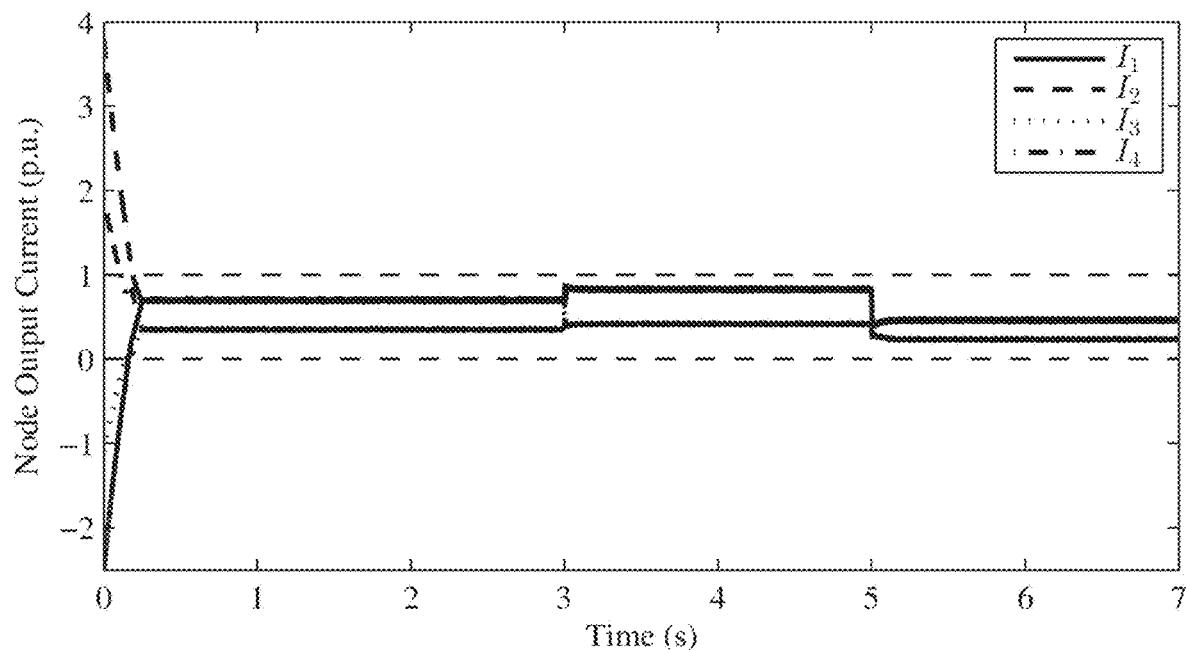
FIGS. 8A-8B are diagrams of the output current $I_i$ curve of the DC/DC converter in the embodiment of the invention; where
Figure 8B:
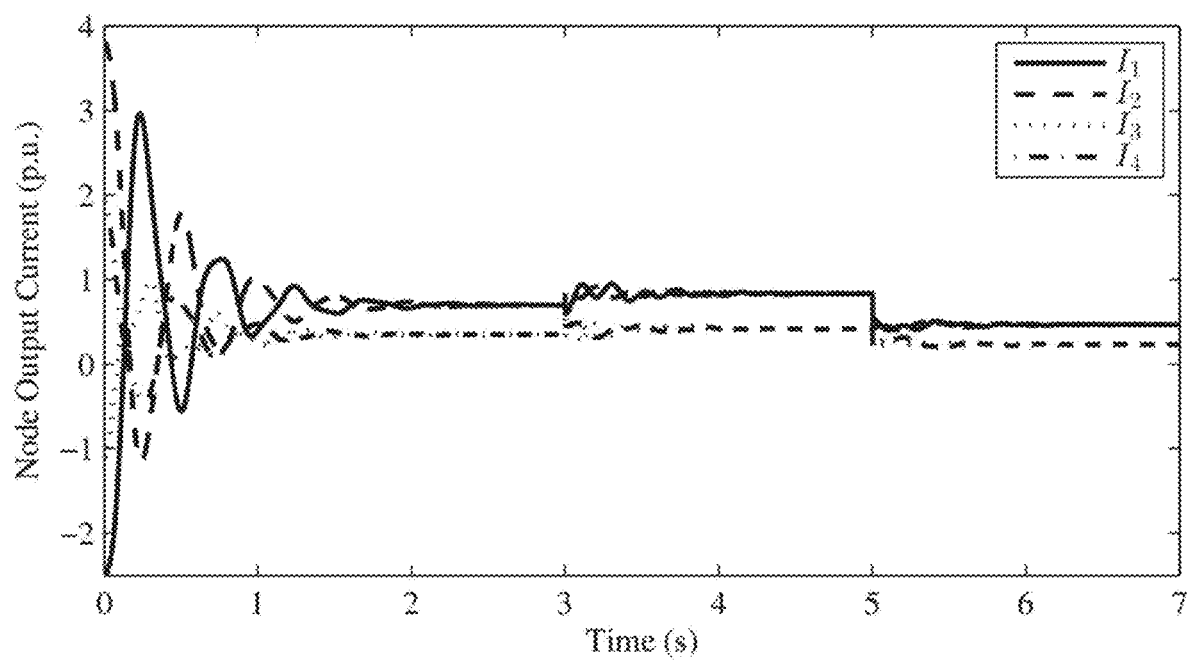

In FIGS. 8A-8B, the output current curves of the DC/DC converter under the distributed algorithm proposed by the invention and the traditional distributed optimization algorithm are given respectively, and the proportional current distribution of 2:1:2:1 under load fluctuation is successfully realized. In contrast, the distributed algorithm proposed by the invention has a faster convergence speed and better dynamic adjustment performance.

Figure 9A:
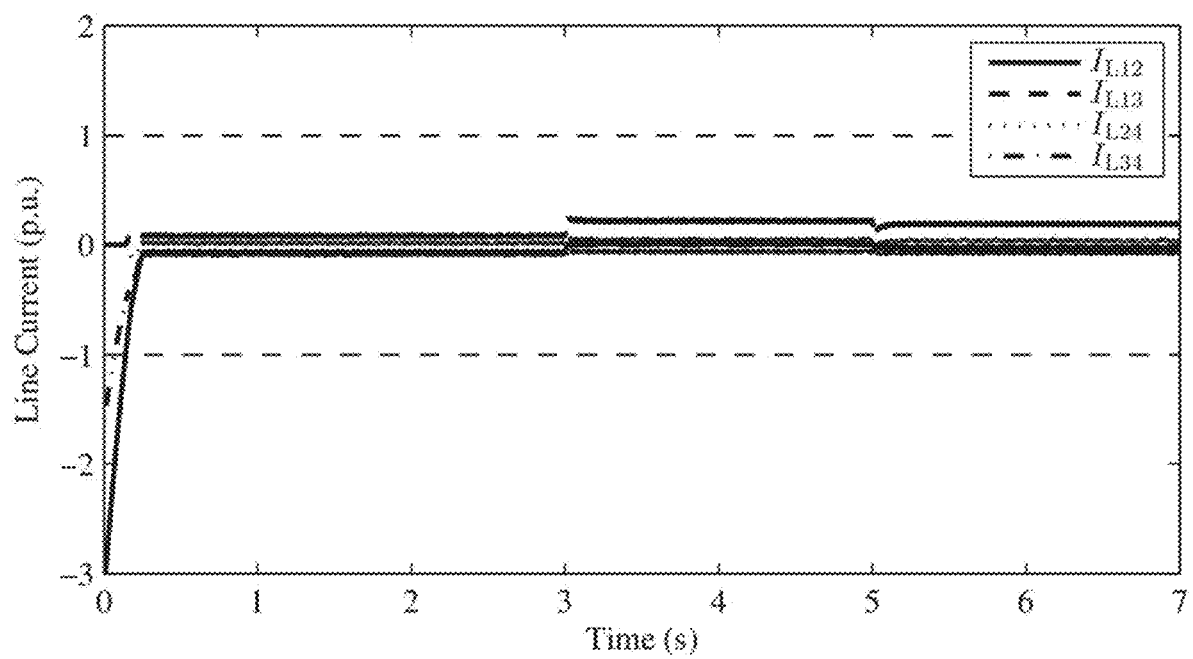
FIGS. 9A-9B are diagrams of the line current $I_{Lij}$ curve of the embodiment of the invention; where
Figure 9B:
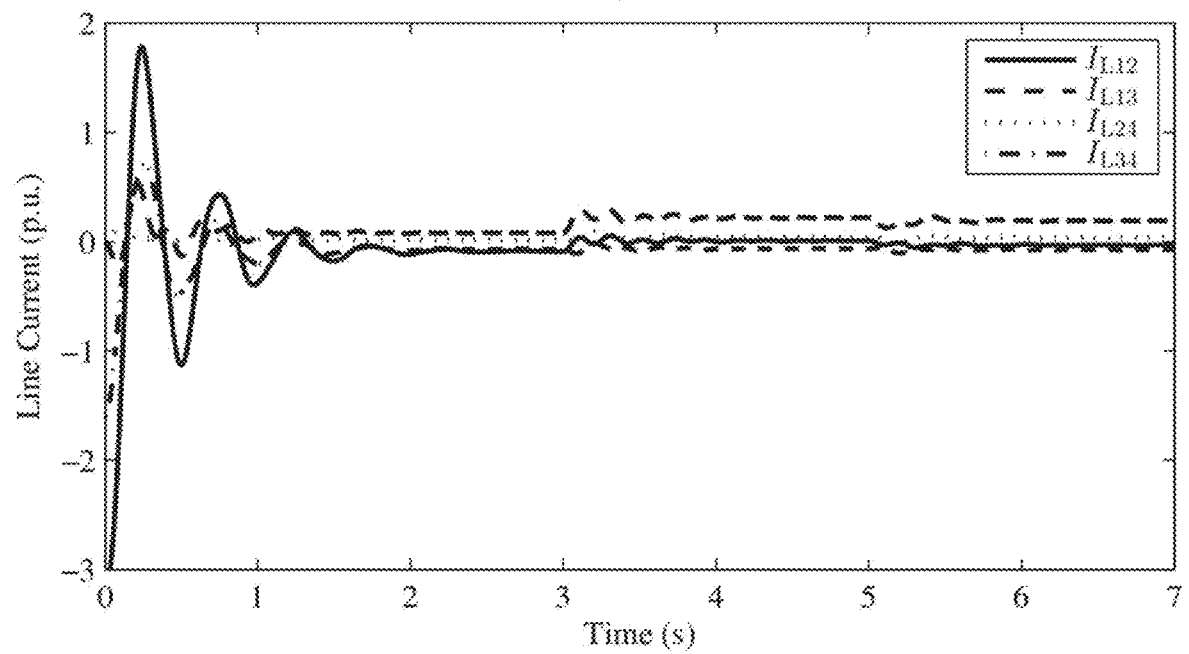

In FIGS. 9A-9B, the line current curves under the proposed distributed algorithm and the traditional distributed optimization algorithm are given respectively. The distributed algorithm proposed by the invention is affected by the penalty term, and quickly converges to the constraint range of 0-1 p.u. in 0.3 s, while the traditional distributed optimization algorithm has a longer adjustment time and relatively larger overshoot.

Figure 10:
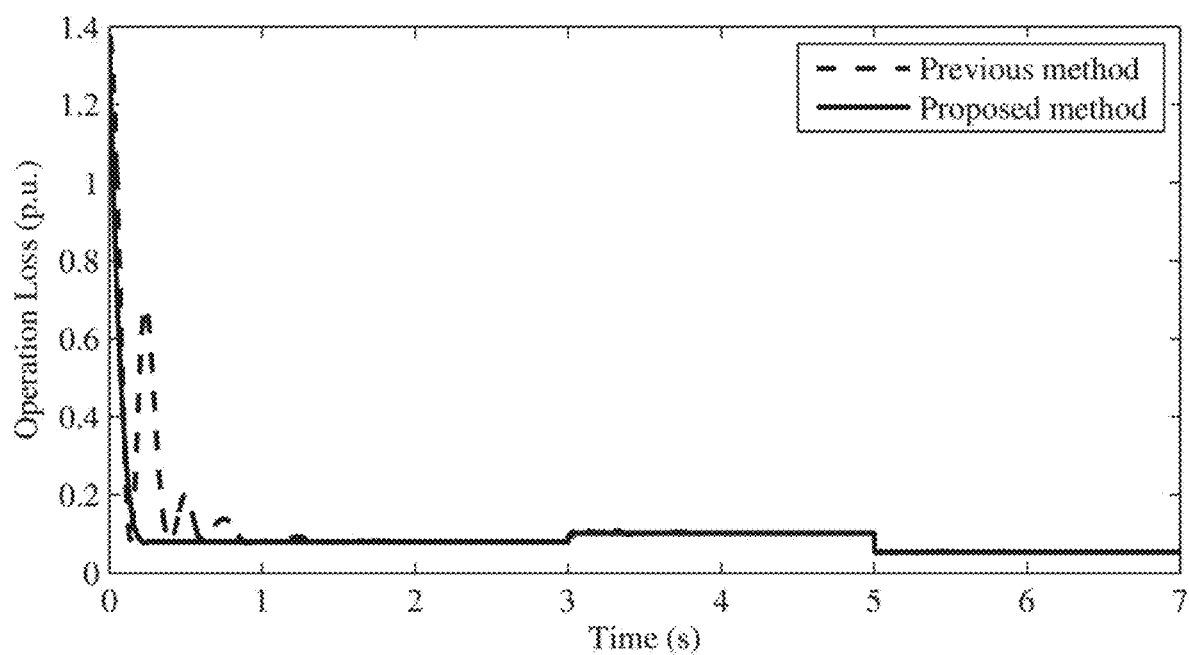
FIG. 10 is a diagram of the operating loss power $P_{Loss}$ curve of the aircraft energy system in the embodiment of the invention.

The loss power curve of the aircraft energy system under the distributed algorithm proposed by the invention and the traditional distributed optimization algorithm is shown in FIG. 10, due to the existence of loss optimization and the limitation of bus voltage, the output current and line current of the DC/DC converter, compared with the traditional distributed optimization algorithm, the distributed algorithm proposed by the invention will make the entire aircraft energy system continue to operate at the lowest loss state. In the time range of 0-7s, the operating loss energy of the traditional distributed optimization algorithm is 0.7390 p.u., while the operating loss energy of the distributed algorithm proposed by the invention is only 0.6288 p.u.

In contrast, the distributed algorithm proposed in the invention not only realizes a series of electrical constraints, but also reduces the operating loss of the entire DC microgrid by 14.91% compared with the traditional distributed optimization algorithm while maintaining the same or even better voltage regulation and current distribution performance.

Therefore, the invention adopts the above distributed optimization control method for the aircraft energy system considering loss, through real-time distributed control, the bus voltage regulation and current distribution can be realized under the premise of ensuring that the near-space aircraft energy system meets the electrical inequality constraints. The soft constraints of the output current and line current of the DC/DC converter are realized by penalty, and the hard constraints of the bus voltage are realized based on the projection operator. At the same time, the performance of current distribution and voltage regulation is realized, and the operating loss of the entire near-space aircraft energy system is taken into account.

Finally, it should be explained that the above embodiments are only used to explain the technical scheme of the invention rather than restrict it. Although the invention is described in detail concerning the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A distributed optimization control method for an aircraft energy system considering loss, comprising the following steps:

S1, based on characteristics of an actual near-space aircraft energy system and a near-space environment, establishing a multi-bus direct current (DC) microgrid system model for the actual near-space aircraft energy system according to Kirchhoff's law; and according to an input voltage and current data and an output voltage and current data of the actual near-space aircraft energy system, fitting a functional relationship between a loss power of a DC/DC converter and an output current of the actual near-space aircraft energy system, as shown in the following:

$$I - I_D = G_e V$$

$$I_L = W_e M_e V$$

wherein V is a bus voltage, I is an output current of the DC/DC converter, $I_D$ is a load current, $I_L$ is a line current, $G_e$ is a node conductance matrix, $M_e$ is a correlation matrix corresponding to an electrical network, elements of $M_e$ are $-1$, $0$, $1$, $W_e$ is a diagonal coefficient matrix, and a diagonal element of $W_e$ is an electrical transmission line conductance at a corresponding position of the correlation matrix;

S2, according to an energy scheduling requirement of the actual near-space aircraft energy system, establishing a system control target as follows:

$$\begin{cases} \lim_{t \to \infty} \frac{I_i(t)}{m_i} = \lim_{t \to \infty} \frac{I_j(t)}{m_j}, & \text{if } i, j = 1, 2, \ldots, N \\ \lim_{t \to \infty} V_i(t) = V_i^{ref}, & \text{if } i = 1, 2, \ldots, N \end{cases}$$

wherein $V_i(t)$ is a bus voltage at time t, $I_i(t)$ is an output current of the DC/DC converter at the time t, and $V_i^{ref}$ is a reference value of a bus voltage of an optical storage node i of the actual near-space aircraft energy system; and $m_i$ is a proportional coefficient of a current distribution;

the actual near-space aircraft energy system satisfies the following electrical inequality constraints:

$$\begin{cases} \underline{V} \leq V \leq \overline{V} \\ \underline{I} \leq I \leq \overline{I} \\ I_L \leq \overline{I_L} \end{cases}$$

wherein $\underline{V}$ and $\overline{V}$ are an upper limit and a lower limit of the bus voltage, $\underline{I}$ and $\overline{I}$ are an upper limit and a lower limit of the output current of the DC/DC converter, $I_L$ is the line current, and $\overline{I_L}$ is an upper limit of the line current;

a total loss of the DC/DC converter of an entire aircraft energy system $P_{Loss}^C$ is in a form of the following:

$$P_{Loss}^C = \sum_{i=1}^{N} P_{Loss(i)}^C = \sum_{i=1}^{N} \left( a_i I_i^2 + b_i |I_i| + c_i \right) = \left( 1_N^T A 1_N + b^T 1_N + 1_N^T C \right)$$

wherein $a_i$ is a secondary loss coefficient of the DC/DC converter in the optical storage node i, $b_i$ is a primary loss coefficient of the DC/DC converter in the optical storage node i, $c_i$ is a loss constant term of the DC/DC converter in the optical storage node i; $1_N = [1, 1, \ldots, 1]^T$ is a unit column vector composed of N elements, and $A = \text{diag}([a_1, a_2, \ldots, a_N])$, $b = [b_1, b_2, \ldots, b_N]^T$ and $c = [c_1, c_2, \ldots, c_N]^T$ are loss coefficients of the DC/DC converter;

a total line loss of the entire aircraft energy system $P_{Loss}^L$ is as follows:

$$P_{Loss}^L = \sum_{i=1}^{N} P_{Loss(i)}^L = \sum_{i=1}^{N} \left( \frac{1}{2} \cdot \sum_{j \in N^i} g_{ij}(V_i - V_j)^2 \right) = V^T G_e V$$

wherein an operating loss o the entire near-space aircraft energy system is as follows:

$$P_{Loss} = P_{Loss}{}^C + P_{Loss}{}^L$$

S3, according to the system control target, establishing an optimal scheduling problem of an aircraft energy system considering the operating loss as follows:

$$P_1 : \min C(V, I, I_D) = w_1 \cdot P_{Loss} + w_2 \cdot \frac{1}{2}(\mu_1 \Delta_I + \mu_2 \Delta_V)$$

$$I_D = I - G_e V$$
$$I_L = W_e M_e V$$
$$\text{s.t.} \quad \underline{V} \leq V \leq \overline{V}$$
$$\underline{I} \leq I \leq \overline{I}$$
$$I_L \leq \overline{I_L}$$

wherein $w_1$, $w_2$, $\mu_1$, $\mu_2 > 0$ are weight coefficients of the system control target, and $\mu_1 + \mu_2 = 1$; a current distribution error is $\Delta_I = (MGV + QI_D)^T (MGV + QI_D)$, wherein $$Q = -\frac{11^T}{1^T M^{-1} 1}, M = \text{diag}\left(\left[\frac{1}{m_1}, \frac{1}{m_2}, \ldots, \frac{1}{m_N}\right]\right)$$

and $(\bullet)^T$ are transposed operations; and a voltage regulation error $\Delta_V$ meets $\Delta_V = (V - V^{ref})^T (V - V^{ref})$, $V^{ref} = [V_1^{ref}, V_2^{ref}, \ldots, V_N^{ref}]^T$;

S4, based on a projection and a penalty, designing a distributed optimization control algorithm as follows:

$$\dot{V}_i = -k \cdot V_i + k \cdot P_{\Omega_{V_i}}\left(V_i - \gamma_i = \sum_{j \in N^i} g_{ij}(\theta_{ij} - \theta_{ji})\right)$$

$$\theta_{ij} = w_1 \cdot (2a_i I_i + b_i \text{sign}(I_i) + 2V_i) +$$

$$\rho_I\left(\nabla \psi(I_i - \overline{I_i}) - \nabla \psi(\underline{I_i} - I_i)\right) + \rho_L \cdot \nabla \psi(I_{Lij} - \overline{I_{Lij}}) + w_2 \cdot \mu_1 \frac{1}{m_i}\left(\frac{I_i - \alpha_i}{m_i}\right)$$

$$\gamma_i = w_2 \cdot \mu_2 (V_i - V_i^{ref})$$

$$\dot{\alpha}_i = -k_1 \sum_{j \in N^i} g_{ij}\left(\frac{\alpha_i}{m_i} - \frac{\alpha_j}{m_j}\right) - k_2(\alpha_i - I_D^i) + k_2 \beta_i$$

$$\dot{\beta}_i = -k_1 \sum_{j \in N^i} g_{ij}\left(\frac{\alpha_i}{m_i} - \frac{\alpha_j}{m_j}\right)$$

wherein $P_{\Omega_{V_i}}(\bullet)$ is a projection on a convex set $\Omega_{V_i} = \{V_i | \underline{V}_i \leq V_i \leq \overline{V}_i\}$, $\nabla(\bullet)$ is a first derivative of a decision variable, $\text{sign}(\bullet)$ is a sign function, $N^i$ is a set of neighbor nodes, wherein the neighbor nodes communicate directly with a local controller of the optical storage node i of the actual near-space aircraft energy system, $I_D{}^i$ is a local load current of the optical storage node i of the actual near-space aircraft energy system, $k_1$, $k_2$, $k > 0$ are controller gains, and $\alpha_i$, $\beta_i$, $\gamma_i$, $\theta_{ij}$ are controller auxiliary variables;

wherein a penalty function $\psi(x)$ is in a form of the following:

$$\psi(x) = \begin{cases} x & \text{if } x \geq \delta \\ -\frac{x^4}{16\delta^3} + \frac{3x^2}{8\delta} + \frac{x}{2} + \frac{3\delta}{16} & \text{if } |x| < \delta \\ 0 & \text{if } x \leq -\delta \end{cases}$$

wherein $\delta \geq 0$ needs to be adjusted according to an actual operation.

2. The distributed optimization control method according to claim 1, wherein the loss power of the DC/DC converter has a quadratic function relationship with the output current of the actual near-space aircraft energy system.

3. The distributed optimization control method according to claim 1, wherein in the S1, the characteristics of the near-space environment comprise altitude, atmospheric pressure, ambient temperature, relative humidity, and light intensity.

4. The distributed optimization control method according to claim 1, wherein in the S2, the energy scheduling requirement of the actual near-space aircraft energy system comprises an output voltage regulation of the actual near-space aircraft energy system, an output current regulation of the DC/DC converter, an output voltage and current limit control of the actual near-space aircraft energy system, and a maximum line current limit, wherein the maximum line current limit ensures safety of a line.

5. The distributed optimization control method according to claim 1, wherein in the S4, the distributed optimization control algorithm is based on the projection and the penalty, an input is a data sampling of an input voltage and current and an output voltage and current of the actual near-space aircraft energy system, and an output is the output voltage of the actual near-space aircraft energy system.

* * * * *